(12) United States Patent
Matsuura

(10) Patent No.: US 6,885,770 B2
(45) Date of Patent: Apr. 26, 2005

(54) IRRADIATION FIELD EXTRACTING METHOD AND APPARATUS AND RECORDING MEDIUM

(75) Inventor: Tomohiko Matsuura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 09/832,953

(22) Filed: Apr. 12, 2001

(65) Prior Publication Data

US 2001/0043732 A1 Nov. 22, 2001

(30) Foreign Application Priority Data

Apr. 17, 2000 (JP) ........................................ 2000-114994

(51) Int. Cl.[7] ................................................ G06K 9/48
(52) U.S. Cl. ...................................... 382/199; 382/132
(58) Field of Search ................................ 382/128, 132, 382/172, 190, 195, 199, 200, 201, 202, 203, 204, 205, 217

(56) References Cited

U.S. PATENT DOCUMENTS

| | | | |
|---|---|---|---|
| 4,851,678 A | * 7/1989 | Adachi et al. | 250/587 |
| 4,962,539 A | * 10/1990 | Takeo et al. | 382/180 |
| 5,268,967 A | * 12/1993 | Jang et al. | 382/132 |
| 5,343,390 A | * 8/1994 | Doi et al. | 382/132 |
| 5,594,807 A | * 1/1997 | Liu | 382/128 |
| 5,790,690 A | * 8/1998 | Doi et al. | 382/128 |

FOREIGN PATENT DOCUMENTS

| | | |
|---|---|---|
| JP | 63-240832 | 10/1998 |
| JP | 2000-023952 | 1/2000 |

* cited by examiner

Primary Examiner—Samir Ahmed
Assistant Examiner—Anand Bhatnagar
(74) Attorney, Agent, or Firm—Fitzpatrick, Cella, Harper & Scinto

(57) ABSTRACT

It is an object to enable an irradiation field to be accurately extracted. An irradiation field extracting method of extracting an irradiation field from a radiation image is constructed by a step of extracting characteristic points in the radiation image by using geometric patterns for detecting an irradiation field edge and a step of detecting an edge portion of the irradiation field on the basis of the characteristic points.

7 Claims, 4 Drawing Sheets

FIG.4
| | (x−5,y)  (x,y)  (x+5,y) | SCORE S |
|---|---|---|
| PATTERN OF PIXEL VALUE |  | 4 |
| |  | 3 |
| | 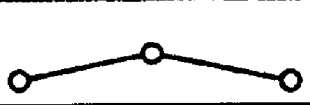 | 2 |
| | 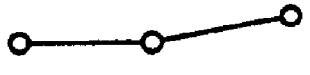 | 3 |
| | 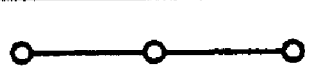 | 2 |
| | 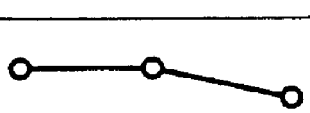 | 1 |
| | 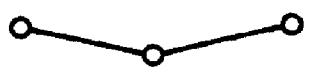 | 2 |
| | 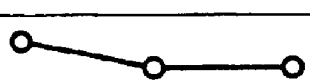 | 1 |
| | 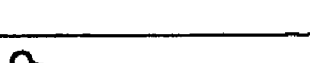 | 0 |

IRRADIATION FIELD EXTRACTING METHOD AND APPARATUS AND RECORDING MEDIUM

BACKGROUND OF THE INVENTION

1. Field of the Invention

The invention relates to an apparatus for extracting an irradiation field from a radiation image.

2. Related Background Art

Owing to the progress of a recent digital technique, a radiation image is converted into a digital image signal, the digital image signal is image processed, and a resultant image is displayed on a CRT or the like or printed and outputted. Upon photographing of a radiation image, to suppress an influence on a region out of a necessary field by an X-ray, prevent scattering from the region out of the necessary field, and prevent a reduction of contrast, an irradiation field narrow-down for allowing a radiation to be irradiated only to the necessary field is generally performed.

To perform the image process, processing parameters are determined from a distribution of density values and the image process is executed on the basis of the determined parameters. When the irradiation field narrow-down is performed, if all of input data is referred to at the time of deciding the processing parameters, information out of the necessary field, that is, unnecessary information is used for determining the image processing parameters. A problem such that the optimized image process cannot be performed to the necessary field occurs.

It is, therefore, necessary to extract the irradiation field and decide the image processing parameters from the information of only an interesting field. For example, the following methods have been proposed as a method of extracting such an irradiation field.

(1) Characteristic points having edge components are detected by a difference between pixel values of two adjacent pixels in an image and an irradiation field is extracted on the basis of the detected characteristic points.

(2) An image field is divided into small regions and an irradiation field is extracted on the basis of density distribution values in the small regions.

According to the method of (1), since the characteristic points are detected by the difference between the pixel values of two adjacent pixels in the image, they are easily influenced by noises or an X-ray shielded object and a possibility that wrong characteristic points are detected is high. Although a method of performing a pre-process by using a smoothing filter or the like in order to reduce the influence of the noises is also considered, according to a smoothed image, there is a problem such that it is difficult to distinguish an edge based on a true irradiation field edge and an edge that is falsely generated due to a scattering line.

According to the method of (2), even in the interesting field, for example, in a lung field edge portion, the density value suddenly changes and there can be a case where a change ratio of the density is higher than that of the irradiation field edge portion. Particularly, in the field where the lung field edge portion, the ribs, and the lung field are come into contact, a distribution value is large. Consequently, there is also a problem such that candidate points of the irradiation field are extracted also from a region out of the irradiation field edge portion and it is difficult to distinguish them.

SUMMARY OF THE INVENTION

The invention is made to solve the above problems and it is an object of the invention to enable an irradiation field to be accurately extracted.

According to the first aspect of the invention, there is provided an irradiation field extracting method of extracting an irradiation field from a radiation image, comprising the steps of:

extracting a characteristic point in the radiation image by using a geometric pattern for detecting an irradiation field edge; and detecting an edge portion of the irradiation field on the basis of the characteristic point.

According to the second aspect of the invention, there is provided an irradiation field extracting method of extracting an irradiation field from a radiation image, comprising the steps of:

holding a plurality of geometric patterns for detecting an irradiation field edge;

comparing a target pixel and peripheral pixel of the target pixel with the plurality of geometric patterns, thereby detecting pixels, as a characteristic point, having a possibility of being an edge portion of the irradiation field in the radiation image, and calculating a score indicative of the possibility that the characteristic point is the edge portion of the irradiation field; and obtaining a line showing the edge portion of the irradiation field from position and score of the detected characteristic point.

The above and other objects and features of the present invention will become apparent from the following detailed description and the appended claims with reference to the accompanying drawings.

BRIEF DESCRIPTION OF THE DRAWINGS

FIG. 4 is a diagram showing patterns of pixel values regarding the left edge of the irradiation field and their scores.

DETAILED DESCRIPTION OF THE PREFERRED EMBODIMENTS

An embodiment of the invention will now be described hereinbelow.

(Embodiment 1)

Figure 1:
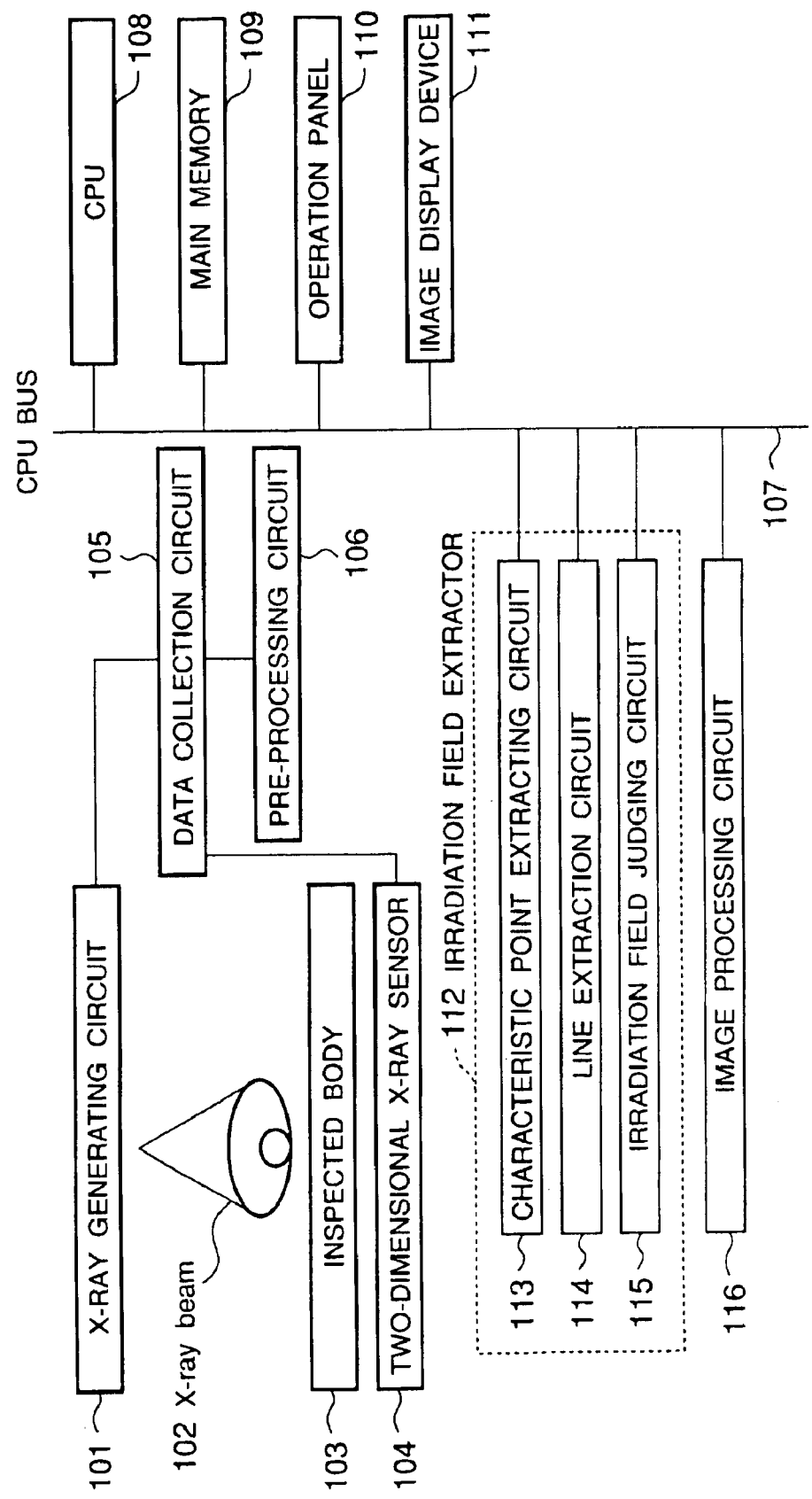
FIG. 1 is a block diagram showing a construction of an X-ray photographing apparatus according to an embodiment 1.

FIG. 1 shows an X-ray photographing apparatus according to an embodiment 1. The X-ray photographing apparatus is a photographing apparatus of an X-ray having an irradiation field extracting function and comprises: a pre-processing circuit 106; a CPU 108; a main memory 109; an operation panel 110; an image display device 111; an irradiation field extractor 112; and an image processing circuit 116. Those component elements can mutually transmit and receive data through a CPU bus 107.

The X-ray photographing apparatus also comprises: a data collection circuit 105 connected to the pre-processing circuit 106; and a two-dimensional X-ray sensor 104 and an X-ray generating circuit 101 which are connected to the data collection circuit 105. Those circuits are also connected to the CPU bus 107.

Figure 2:
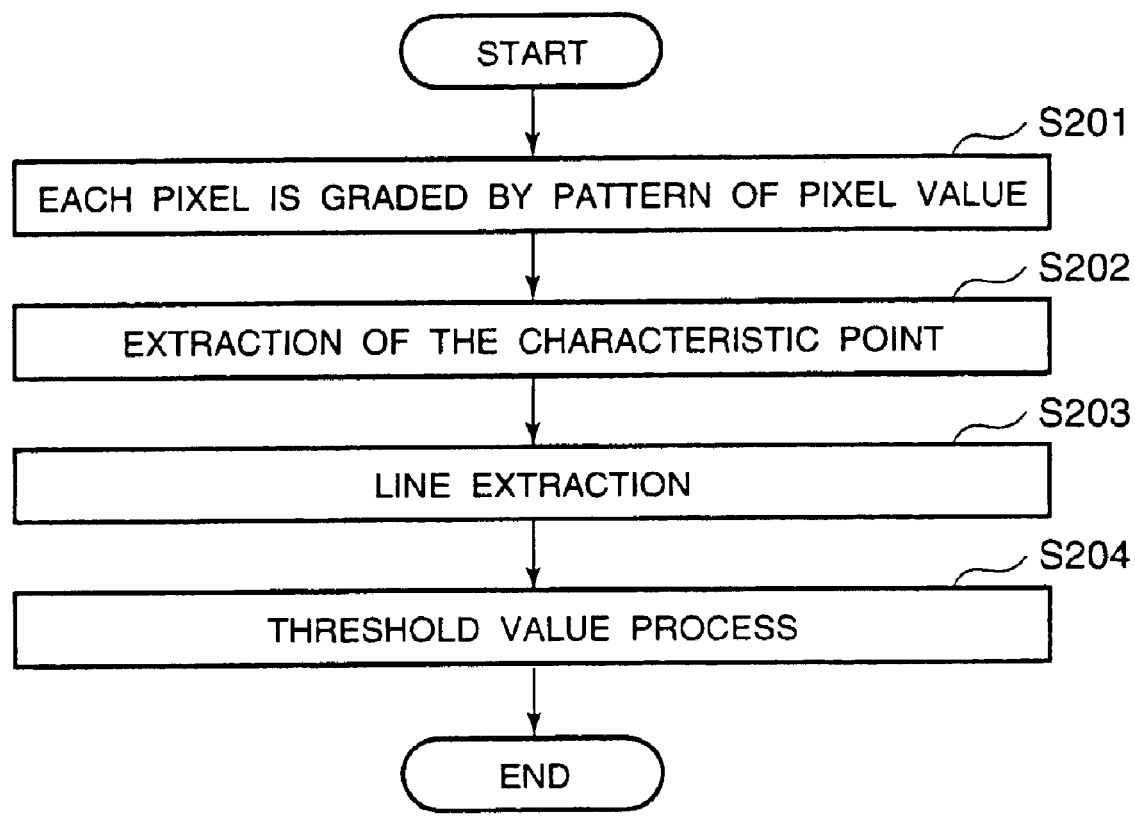
FIG. 2 is a diagram showing a flow of processes for extracting an irradiation field.
Figure 3:
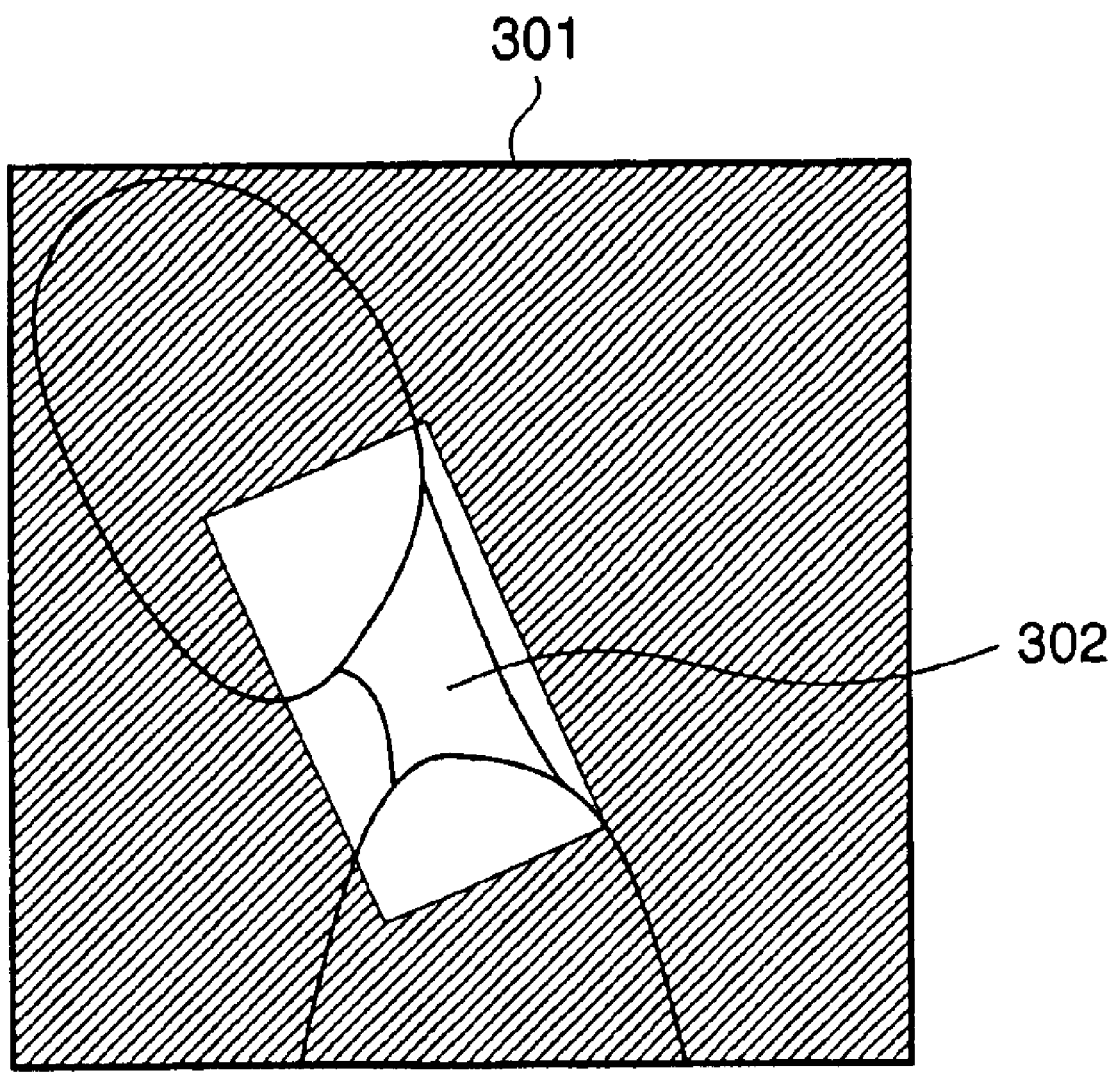
FIG. 3 is a diagram showing an example of a human image (side elevational view of the cervical vertebra)

FIG. 2 is a flowchart showing a flow of processes of the irradiation field extractor 112 according to the embodiment 1. FIG. 3 is a diagram showing an irradiation field. A rectangle 301 indicates the whole original image which is obtained from the 2-dimensional X-ray sensor 104, and a rectangle 302 shows an irradiation field of the X-ray.

In the X-ray photographing apparatus as mentioned above, first, the main memory 109 stores various data including program data necessary for processes in the CPU 108 and is used as a work memory of the CPU 108. The CPU 108 performs an operation control and the like of the whole apparatus in accordance with instructions from the operation panel 110 by using the main memory 109. Thus, the X-ray photographing apparatus operates as follows.

First, the X-ray generating circuit 101 radiates an X-ray beam 102 to an inspected body 103.

The X-ray beam 102 radiated from the X-ray generating circuit 101 passes through the inspected body 103 while being attenuated, arrives at the 2-dimensional X-ray sensor 104, and is outputted as an X-ray image by the 2-dimensional X-ray sensor 104. The X-ray image which is outputted from the 2-dimensional X-ray sensor 104 is, for example, a human body image or the like.

The data collection circuit 105 converts the X-ray image outputted from the 2-dimensional X-ray sensor 104 into an electric signal and supplies it to the pre-processing circuit 106. The pre-processing circuit 106 executes pre-processes such as offset correcting process, gain correcting process, and the like to the signal (X-ray image signal) from the data collection circuit 105. The X-ray image signal which was pre-processed by the pre-processing circuit 106 is transferred as an original image to the main memory 109 and irradiation field extractor 112 through the CPU bus 107 by the control by the CPU 108.

The irradiation field extractor 112 analyzes the original image, extracts the irradiation field, and forms irradiation field information. The image processing circuit 116 executes various image processes to the X-ray image signal of the original image on the basis of the irradiation field information. As image processes, for example, a histogram of the pixel values in the irradiation field is obtained on the basis of the irradiation field information, and gradation processing conditions by which a contrast of an interesting field is set to a contrast suitable for a diagnosing process are calculated. The gradation process is performed to the original image by using the calculated gradation processing conditions.

The irradiation field extractor 112 comprises: a characteristic point extracting circuit 113 for extracting pixels, as characteristic points, with high possibility of being the pixels constructing edges from the original image; a line extraction circuit 114 for extracting a line from a plurality of characteristic point information obtained; and an irradiation field judging circuit 115 for determining whether the extracted line corresponds to an irradiation field edge or not.

A flow of the irradiation field extracting process will now be described with reference to FIG. 2.

The original image which was pre-processed by the pre-processing circuit 106 is transferred to the irradiation field extractor 112 through the CPU bus 107. In the irradiation field extractor 112, an edge likelihood constructing the irradiation field edge of each pixel in the image is first scored by the characteristic point extracting circuit 113 by using pre-stored patterns of the pixel values as shown in, for example, FIG. 4 (S201).

In step S201, a target pixel (x, y) is scored from the pattern of the input pixel value on the basis of a score table as shown in, for example, FIG. 4. FIG. 4 shows the patterns of the pixel values which are used for extracting the left edge of the irradiation field. In FIG. 4, the patterns of the pixel values of the target pixel, the pixel that is 5 pixels before, and the pixel that is 5 pixels ahead are used. Since the left edge of the irradiation field indicates a point which changes from a region (the X-ray is hardly inputted into the sensor) out of the irradiation field into the irradiation field (the X-ray is inputted into the sensor), the pixel values change from a small value to a large value. Therefore, as shown in FIG. 4, a score indicative of the left edge likelihood of the irradiation field is set in accordance with the change of the pixel values of three pixels.

With respect to the right edge, upper edge, and lower edge of the irradiation field, the pixel pattern of the left edge shown in FIG. 4 is rotated in accordance with the changing direction of the pixel value and used.

The pixel pattern can be also independently used for each edge. The pixel pattern can be also changed in accordance with a portion where the pixel pattern is photographed.

As another method of calculating a score s, all or a part of the pixel values $f(x-5, y)$, $f(x, y)$, and $f(x+5, y)$ of the respective pixel values can be also used as parameters. Further, although the pattern based on the pixels at three points is scored in the embodiment, a pattern based on a larger number of pixels can be also scored.

Subsequently, n points which are counted from the high score are similarly extracted as characteristic points by the characteristic point extracting circuit 113 (S202). For example, it is possible to use a method of extracting 500 characteristic points from the whole image by setting n=500 or a method of extracting three characteristic points of the image by setting n=3 every line.

Subsequently, lines serving as candidates of the irradiation field edge in the image are extracted by the line extraction circuit 114 from a plurality of characteristic points derived by the characteristic point extracting circuit 113 and their score information (S203). In the embodiment, all of the lines which pass in the image are set to the candidates, the total of the scores of the characteristic points existing on the candidate lines is held as a score of the line, and the line of the highest score is selected. As an extracting method of the line, another method can be also used.

Whether the line extracted at last is used as an irradiation field edge or not is determined by the irradiation field judging circuit 115. A certain threshold value Th is set and when a score Ls of the line extracted by the line extraction circuit 114 is Ls>Th, this line is used as an irradiation field edge.

The processes in steps S203 and S204 can be also executed as follows. In S203, lines whose scores Ls are equal to or larger than a predetermined value are extracted. In S204, if only one line is extracted in S203, this line is set as an edge portion. If a plurality of lines are extracted in S203, one of them is selected on the basis of the position of the edge portion and set as an edge portion (for example, in case of the left edge, the line locating at the leftmost edge is set as an edge portion).

The irradiation field edge at one edge (for example, left edge) is extracted by the processes of the irradiation field extractor 112 described above. Similarly, by extracting the irradiation field edge also with respect to the other edges (for example, right edge, upper edge, lower edge) by using the irradiation field extractor 112, the irradiation field is finally extracted.

According to the embodiment as mentioned above, when the characteristic points are extracted, not only the difference between the pixel values but also the geometric patterns of the pixel values are used. Therefore, the characteristic points are difficult to be influenced by the noises or X-ray shielded object which causes the local change in pixel values and the characteristic points can be stably extracted at high precision.

Since the smoothing process for the purpose of the noise removal or the like is not performed, the edge due to the true irradiation field edge which appears sharply and the pseudo edge due to a scattering line which appears as a blur line can be easily distinguished.

It is, therefore, possible to extract the line serving as an irradiation field edge at high precision and stably extract the irradiation field in the radiation image at high precision.

When the line is searched from the image, since the simple method whereby the total score of the characteristic points is calculated is used, a long calculating time is not required. Therefore, the irradiation field in the radiation image can be extracted at a high speed.

By setting all of the lines which pass in the image to the search candidates, even with respect to the irradiation field narrowed down obliquely for the sensor surface of the photographing apparatus, the irradiation field in the radiation image can be stably extracted at high precision. Because of the same reasons, when the X-ray is irradiated onto the sensor surface of the photographing apparatus in the direction other than the vertical direction, although the irradiation field is trapezoidal, even in this case, there is an effect that the irradiation field can be stably extracted at high precision.

(Another Embodiment)

The invention also incorporates a case where program codes of software for realizing the functions of the embodiment (for example, functions which are realized by the flowchart of FIG. 2) are supplied to a computer in an apparatus or a system connected to the various devices so as to make the various devices operative in order to realize the functions of the embodiment 1, and a computer (CPU or MPU) of the system or apparatus makes the various devices operative in accordance with the stored program, thereby realizing those functions.

In this case, the program codes themselves of the software realize the functions of the embodiment mentioned above. The program codes themselves and means for supplying the program codes to the computer, for example, a memory medium in which those program codes have been stored construct the invention.

As a memory medium for storing those program codes, for example, it is possible to use a floppy disk, a hard disk, an optical disk, a magnetooptic disk, a CD-ROM, a magnetic tape, a non-volatile memory card, an ROM, or the like.

Not only in the case where the computer executes the supplied program codes and the functions of the embodiment mentioned above are realized but also in the case where the program codes cooperate with the OS (operating system) which is operating in the computer or another application software or the like and the functions of the embodiment mentioned above are realized, the program codes are incorporated in the embodiment of the invention.

Further, the invention also incorporates a case where the supplied program codes are stored into a memory equipped for a function expanding board of a computer or a function expanding unit connected to a computer and, thereafter, a CPU or the like equipped for the function expanding board or function expanding unit executes a part or all of the actual processes on the basis of instructions of the program codes, and the functions of the embodiment mentioned above are realized by those processes.

The present invention is not limited to the foregoing embodiments but many modifications and variations are possible within the spirit and scope of the appended claims of the invention.

What is claimed is:

1. An irradiation field extracting method of extracting an irradiation field from a radiation image, comprising:

a pattern selecting step for obtaining, in pixel groups in the radiation image, a pattern for each pixel, the pattern being determined by pixel values of a plurality of pixels selected based on coordinates of the pixels;

a pixel scoring step, assigning a score to each pixel based on the pattern;

a line segment scoring step for assigning, in line segment groups in the radiation image, the summation of the scores of the pixels existing on a line segment as a score to the line segment; and a line segment selecting step for selecting a line segment as an irradiation field edge based on the score of the line segment in the line segment group.

2. A method according to claim 1, wherein only pixels having scores within a predetermined score range are used for the calculation of the summation in the line segment scoring step.

3. A method according to claim 1, wherein in the detection of the edge portion of said irradiation field, a line having a possibility that it corresponds to said irradiation field edge is extracted on the basis of said score-assigned pixels.

4. A method according to claim 3, wherein in the detection of the edge portion of said irradiation field, it is determined whether or not said extracted line corresponds to said irradiation field edge.

5. A method according to claim 1, wherein an image processing condition for said radiation image is set by using data in said detected irradiation field.

6. An irradiation field extracting apparatus comprising:

pattern selecting means for obtaining, in pixel groups in the radiation image, a pattern for each pixel, the pattern being determined by pixel values of a plurality of pixels selected based on coordinates of the pixels;

pixel scoring means for assigning a score to each pixel based on the pattern;

line segment scoring means for assigning, in line segment groups in the radiation image, the summation of the scores of the pixels existing on a line segment as a score to the line segment; and line segment selecting means for selecting a line segment as an irradiation field edge based on the score of the line segment in the line segment group.

7. A recording medium which records a computer-readable program, wherein said program is used for executing an irradiation field extracting method of extracting an irradiation field from a radiation image, said program comprising:

a pattern selecting step for obtaining, in pixel groups in the radiation image, a pattern for each pixel, the pattern being determined by pixel values of a plurality of pixels selected based on coordinates of the pixels;

a pixel scoring step for assigning a score to each pixel based on the pattern;

a line segment scoring step for assigning, in line segment groups in the radiation image, the summation of the scores of the pixel existing on a line segment as a score to the line segment; and a line segment selecting step for selecting a line segment as an irradiation field edge based on the score of the line segment in the line segment group.

* * * * *